United States Patent

[11] 3,620,257

[72] Inventor Richard H. Wright, Jr.
Rte. 1, Packinghouse Road, Kingsport, Tenn. 37660
[21] Appl. No. 44,984
[22] Filed June 10, 1970
[45] Patented Nov. 16, 1971

[54] ADJUSTABLE CLEANOUT COVER
6 Claims, 2 Drawing Figs.
[52] U.S. Cl. .................................................. 138/89, 138/92
[51] Int. Cl. .................................................. F16l 55/10
[50] Field of Search ....................................... 138/89, 92, 96; 220/3.7, 24.2, 41, 42

[56] References Cited
UNITED STATES PATENTS

| | | | |
|---|---|---|---|
| 1,253,806 | 1/1918 | Frazer | 138/89 |
| 1,592,382 | 7/1926 | Nunn | 138/89 |
| 2,202,147 | 5/1940 | Gerriets | 138/96 X |
| 2,679,155 | 5/1954 | Zinn | 138/89 X |
| 3,148,708 | 9/1964 | Panella | 138/89 |

Primary Examiner—Herbert F. Ross
Attorney—Harrington A. Lackey

ABSTRACT: A cover assembly for a cleanout pipe and plug projecting outwardly beyond an upright wall surface, including a cap having a cylindrical wall and a telescopingly received cylindrical sleeve longer than the cylindrical wall of the cap, and threaded fastening means securing the cap to the plug of the pipe concentrically for compression of the sleeve against the wall surface. The sleeve is also preferably provided with annular scores to form separable sleeve sections for varying the effective length of the sleeve.

3,620,257

INVENTOR
RICHARD H. WRIGHT, JR.
BY
ATTORNEY

ADJUSTABLE CLEANOUT COVER

BACKGROUND OF THE INVENTION

This invention relates to a cover assembly for a cleanout pipe, and more particularly to an adjustable cover assembly for a projecting cleanout pipe.

Even the most skillful plumbers and plumbing contractors have difficulty in maintaining the outlet ends of cleanout pipes inside the plane of, or even projecting a uniform distance outside of the plane of, an exterior wall surface in the construction of a building. Sometimes the plugged end of the cleanout pipe is very close to the plane of the wall surface, and sometimes it projects outwardly from the wall some distance, so that the amount of projection usually always varies from one building to another.

Although various types of fixed covers have been provided for the plugged end of cleanout pipes, nevertheless the dimensions of the cover never conform to the length of pipe projection.

SUMMARY OF THE INVENTION

It is therefore an object of this invention to provide an adjustable cover assembly for the plugged end of a cleanout pipe, which is adapted to accommodate cleanout pipes having varying projections from the exterior wall.

The cleanout cover assembly made in accordance with this invention is basically a two-piece unit, including a cap having a cylindrical wall, one end closed and the other end open, and a cylindrical sleeve of slightly less diameter and of greater length than the cylindrical wall of the cap. The assembly also includes securing means for holding the cap concentrically to the cleanout plug. Thus, the cylindrical sleeve telescopingly received within the cap may be slidably adjusted within the limits of the length of the cylindrical wall of the cap to abut against the wall surface around the pipe and accommodate cleanout pipes projecting at varying distances, within limits.

The cleanout cover assembly made in accordance with this invention also contemplates a sleeve provided with annular scores spaced at predetermined intervals, preferably less than the length of the cylindrical wall of the cap so that excessive sections may be easily separated from the desired remaining lengths of sleeve sections to accommodate a pipe projecting a predetermined distance from the wall surface. Any amount of projected distances may be accommodated by relative movements of the sleeve within the annular wall of the cap.

DESCRIPTION OF THE PREFERRED EMBODIMENT

Figure 2:
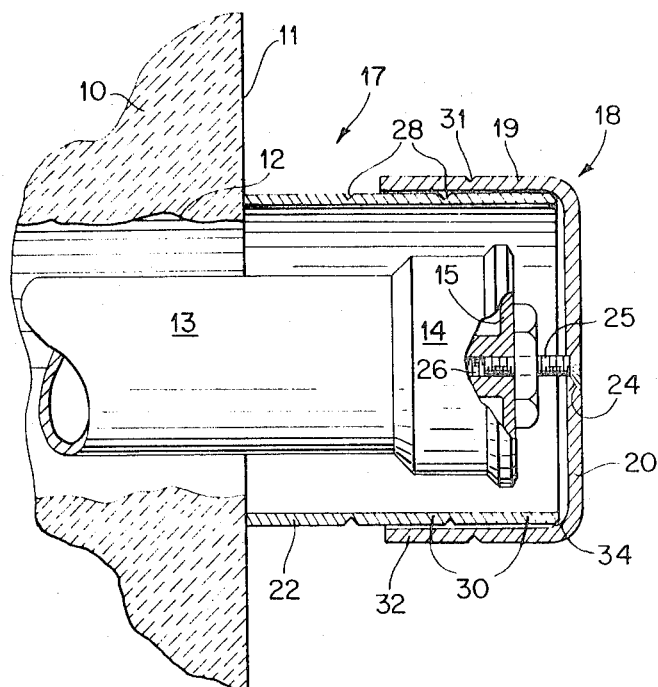
FIG. 2 is a fragmentary sectional elevation of the cover assembly in operative position upon a cleanout pipe projecting from a wall surface.

Referring now to the drawings in more detail, FIG. 2 discloses a section of a brick wall 10 having an exterior vertical surface 11 and a cleanout opening 12 therethrough.

Extending outwardly through the cleanout opening 12 is a typical cleanout pipe 13 having a bell end 14 closed by a cleanout plug 15. As shown in FIG. 2, the bell end 14 of the cleanout pipe is projecting a considerable distance outward beyond the exterior surface 11 of the wall 10.

The cleanout cover assembly 17 made in accordance with this invention includes a cap 18 having a cylindrical wall 19 and one end wall 20. The opposite end of the cap 18 is open.

The cover assembly 17 also includes a cylindrical sleeve 22 of a diameter slightly less than the diameter of the cylindrical wall 18 to permit telescoping reception of the sleeve 22 within the open end of the cap 18. The diameter of the sleeve 22 is also greater than the largest diameter of the pipe 13, which would be the bell 14, and preferably greater than the diameter of the cleanout opening 12.

A recessed bolthole 24 is formed in the center of the top wall 20 of the cap 18 through which a threaded bolt 25 is adapted to be extended, as disclosed in FIG. 2. The threaded bolt 25 is adapted to threadedly engage a tapped hole 26 in the center of the cleanout plug 15. Some cleanout plugs are already provided with these tapped holes; others are not. Accordingly, for those plugs which do not have the holes, the holes must be tapped.

Figure 1:
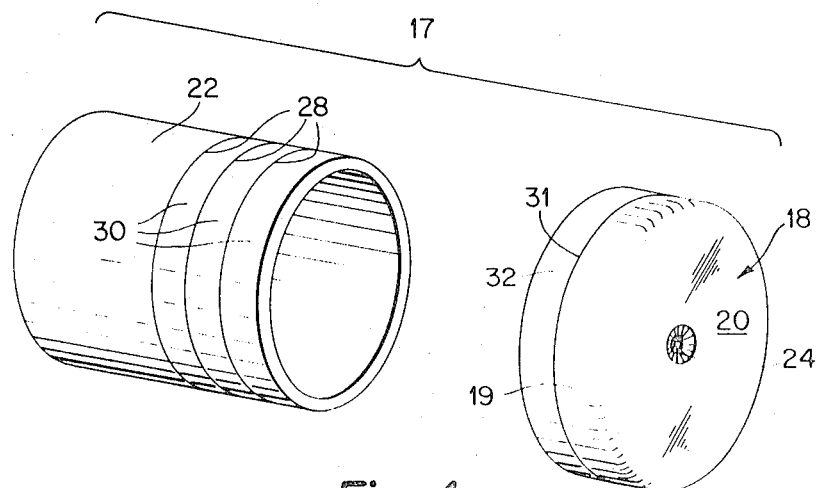
FIG. 1 is a perspective exploded view of the cover assembly made in accordance with this invention, in which the sleeve and cap are scored.

The cylindrical sleeve 22 is provided with axially spaced annular scores 28 for forming separable sleeve sections 30. Although only three scores 28 have been disclosed in FIG. 1, nevertheless the entire length of the sleeve 22 may be provided with additional scores 28. By separating one or more sleeve sections 30 at the corresponding scores 28, a sleeve 22 of predetermined length may be acquired for use in the cover assembly 17, depending upon the amount that the pipe 13 projects beyond the wall surface 11.

If desired, the cylindrical wall 19 of the cap 18 may also be provided with one or more annular scores 31 to form cap wall sections 32, which also may be separable from the remaining portions of cap wall 19 to vary the length of the cap 18.

In the preferred operation of the invention, separable sections 30 are removed from the remaining portion of the sleeve 22 until the length of the sleeve 22 is slightly greater than the distance the plug 15 projects outwardly beyond the exterior wall surface 11. The sleeve 22 is then telescopingly fitted over the cleanout pipe 13 until its end abuts substantially flush against the exterior wall surface 11 surrounding the opening 12. The cap 18 is then telescopingly fitted over the exposed end of the sleeve 22 until the exterior end of the sleeve abuts against the shoulder 34 formed by the inner section of the cylindrical wall 19 and the end wall 20, as best disclosed in FIG. 2.

The bolt 25 is inserted through the bolthole 24 in the end wall 20 to threadedly engage the tapped hole 26 in the plug 15. The bolt 25 is then tightened until the sleeve 22 is held in compression between the cap 18 and the wall surface 11. If the cleanout pipe 13 is not exactly perpendicular to the exterior wall surface 11, a slightly angular fit may be provided between the cylindrical wall 19 of the cap 18 and the sleeve 22, depending upon the tolerance between the wall 19 and the sleeve 22, so that the end of the sleeve 22 may abut substantially flush against the wall surface 11.

If a cover assembly 17 is desired to fit as closely to the plug 15 as possible without any wasted space, the sleeve 22 could be adapted to slip fit snugly within the cylindrical wall 19 so that the cap 18 can be adjusted axially at any position relative to the sleeve 22, within the length of the cylindrical cap wall 19. Thus, in the example disclosed in FIG. 2, the sleeve section 30 adjacent the exterior wall 11 could be separated at the score line 28 and the rest of the sleeve 22 moved down into engagement with the wall 11, so that the cap 18 could be moved slightly closer to the plug 15. However, in this case, the outer end of the sleeve 22 would not abut against the shoulder 34, but would be held in compression against the exterior wall surface 11 solely by the frictional fit between it and the cylindrical cap wall 19.

The intervals between the score lines 28 may be of any desired dimensions, and although preferably uniform, may be of different intervals. Typical lengths for sleeve sections 30 are three-eighths of an inch each.

The cap wall section 32 may be separated from the remaining wall portion 19 whenever desired, for example, when the cap wall section 32 might abut against the wall surface 11, causing the cap 18 to project too far beyond a cleanout plug 15, which itself has a relatively small projection beyond the wall surface 11.

Thus, a cleanout cover assembly has been provided which will adequately conceal the projecting end of the cleanout pipe 13, regardless of the error incurred in the roughing-in of the plumbing compared with the final location of the finished exterior wall surface 11. The projecting end of the cleanout pipe 13 is not only concealed by the cover assembly 17 for esthetic reasons, but also protects the projecting end of the pipe, as well as the cleanout opening 12, from the elements.

What is claimed is:

1. A cover assembly for a cleanout pipe having a plug projecting through an opening in a wall surface, comprising:
   a. a cap having a cylindrical wall, an end wall, and an opposite open end,
   b. a cylindrical sleeve of a diameter greater than the cleanout pipe and slightly less than the diameter of said cylindrical wall, so that said sleeve may be telescopingly received through the open end of said cap, said cylindrical sleeve having axially spaced annular score lines for separating a portion of said sleeve thereby to cover that portion of the cleanout pipe and plug extending outwardly of the wall surface, and
   c. securing means for securing said cap to the plug and on said sleeve and concentrically of the pipe and said sleeve.

2. The invention according to claim 1 in which the diameter of said sleeve is greater than the diameter of the opening, so that when said sleeve is received in said cap and said cap is secured to said plug, said sleeve is held in compression between said cap and the wall surface concentrically of the pipe.

3. The invention according to claim 2 in which said annular scores are axially spaced at predetermined intervals to form sleeve sections, each section being separable from the remainder of said sleeve.

4. The invention according the claim 2 in which said cap comprises at least one annular score in said cylindrical wall to form cap wall sections, each cap wall section being separable from the remainder of said cap.

5. The invention according to claim 1 further comprising a cleanout pipe having an open end projecting through said opening and beyond said wall surface, a plug in the open end of said cleanout pipe, said cap receiving said sleeve, and said securing means securing said cap to said plug so that said sleeve is concentric of said pipe and held in compression against said wall surface.

6. The invention according to claim 5 further comprising a tapped hole in the outer end of said plug and coaxially of said pipe, said securing means comprising a bolthole in the center of said end wall, and a threaded bolt extending through said bolthole and threadedly engaging said tapped hole.

* * * * *